United States Patent [19]

Kitson et al.

[11] Patent Number: 5,522,608
[45] Date of Patent: Jun. 4, 1996

[54] SELF COMPENSATING AND GEOMETRICALLY CENTERING CHUCK

[75] Inventors: James A. Kitson, Clarkston; Terry M. Miller, Lake Orion, both of Mich.

[73] Assignee: Illinois Tool Works Inc., Glenview, Ill.

[21] Appl. No.: 357,914

[22] Filed: Dec. 16, 1994

[51] Int. Cl.$^6$ ............................ B23B 31/16
[52] U.S. Cl. .................... 279/132; 279/123; 279/119
[58] Field of Search .................... 279/119, 123, 279/132, 133

[56] References Cited

U.S. PATENT DOCUMENTS

| Re. 24,684 | 8/1959 | Swanson | 279/119 |
|---|---|---|---|
| 2,494,166 | 1/1950 | Drissner | 279/132 |
| 2,745,671 | 5/1956 | Sloan et al. | 279/119 |
| 2,859,044 | 11/1958 | Buck et al. | 279/123 |
| 3,244,430 | 4/1966 | Buck | 279/123 |

*Primary Examiner*—Steven C. Bishop
*Attorney, Agent, or Firm*—Dvorak and Traub

[57] ABSTRACT

A method and apparatus for a self compensating and geometrically centering jaw type chuck for engaging and retaining a workpiece, particularly an asymmetric workpiece, wherein a geometric center of the workpiece is aligned with a rotation axis of the chuck. The chuck includes two opposing jaws each of which is rotatable about a pivot pin extending from a radially adjustable jaw slide. Each jaw includes an outer end that is slidably and rotatably coupled to a rotatable ring symmetrically disposed about the rotation axis by a synchronizing pin having a first end rotatably disposed on the rotatable ring, and a second end, slidably engagable with the outer end of the jaw. The rotation of one jaw about the pivot pin rotates, in synchronism, the rotatable ring and the other jaw to maintain the geometric center of the asymmetric workpiece in alignment with the rotation axis of the chuck. The jaw slides are radially adjustable to open and close the jaws by reciprocating a piston along the rotation axis of the chuck. The piston is coupled to the jaw slides by two opposing cranks rotatable about a crank pivot which provides a levering action to adjust the jaw slides. A passive spring assembly applies a force to the piston which biases the jaws in the closed position. The jaws are opened in response to an applied counter force applied to the piston by pneumatic or hydraulic actuation.

8 Claims, 2 Drawing Sheets

1

SELF COMPENSATING AND GEOMETRICALLY CENTERING CHUCK

FIELD OF THE INVENTION

The present invention generally relates to a jaw type chuck, and more specifically, to a self compensating and geometrically centering chuck for engaging anti securely retaining an asymmetric workpiece, wherein the self compensating chuck accurately aligns a geometric center of the asymmetric workpiece with a rotation axis of the chuck.

BACKGROUND OF THE INVENTION

In the manufacture of many articles, and in particular those comprising a metal, the article is initially formed by a casting or forging step dieting the manufacturing process. This step, and other initial forming steps, usually results in an imperfect, raw article due to pattern variation and die shift. For example, a raw shaft often has an offset that defines a seam or parting line extending along a length of the shaft which results in a quasi-elliptical or generally asymmetric cross-sectional shape. Further, a raw shaft is generally not balanced about its geometric center. In some instances, the imperfection is inconsequential, and in others, the imperfection must be removed in a subsequent refinement step during the manufacturing process.

A raw article may be refined in machining and grinding operations which remove a disposable amount of material, or cleanup stock, that is designed into the raw article. In the case where a portion of the perfected article is symmetric about an axis, for instance a shaft, these refinement operations generally require that the raw article be engaged and retained in a chuck of a lathe or other rotating machinery. Due to the asymmetrical shape of the raw shaft, prior art chucks do not accurately align the geometric center of the shaft with the rotation axis of the machinery, which is generally aligned with the rotation axis of the chuck. More specifically, in a standard four jaw chuck, normally only three of the four jaws will engage an asymmetric shaft, which results in improper alignment of the geometric center of the shaft with the rotation axis of the chuck. The disadvantages of a four jaw chuck may be overcome in part by a three jaw chuck, wherein all three jaws are likely to engage and securely retain the shaft. A three jaw chuck however does not entirely overcome the problem of inaccurate alignment of the geometric center of the shaft with the rotation axis of the chuck.

Inaccurate alignment, or chucking, in combination with the unbalanced nature of the raw shaft, may result in an unbalance load condition as the shaft is rotated about the rotation axis of the chuck. This circumstance may be detrimental to rotatable machinery, and in extreme cases, hazardous to machine operating personnel. Inaccurate alignment of a raw shaft in a chuck also frustrates the optimization of some machine operations resulting in reduced productivity and economic efficiency. For example, in the manufacture of a precision balanced rotating article, like a crankshaft, it may be advantageous to measure the imbalance of a raw, asymmetric shaft by rotating the shaft about its geometric center, and then correcting the imbalance by moving the rotation axis of the shaft in relation to the geometric center.

In view of the discussion above, there exists a demonstrated need for an advancement in the art of accurately centering an asymmetric workpiece in a chuck.

It is therefore an object of the present invention to provide a novel method and apparatus for a self compensating and geometrically centering chuck.

It is also an object of the present invention to provide a self compensating and geometrically centering chuck having two or more rotatable jaws for engaging and securely retaining an asymmetric workpiece, wherein the jaws accurately align a geometric center of the asymmetric workpiece with a rotation axis of the chuck.

It is a further object of the present invention to provide a self compensating and geometrically centering chuck that includes a rotatable ring coupled to the rotatable jaws, wherein the rotatable ring compensates for the rotation of one jaw by rotating the other jaw to accurately align the geometric center of the asymmetric workpiece with the rotation axis of the chuck.

Accordingly, the present invention is directed toward a novel method and apparatus for a self compensating and geometrically centering jaw type chuck for engaging and retaining an asymmetric workpiece, wherein a geometric center of the asymmetric workpiece is accurately aligned with a rotation axis of the chuck. The chuck includes two opposing jaws each of which is rotatable about a pivot pin extending from a radially adjustable jaw slide. Each jaw includes an outer end that is slidably and rotatably coupled to a rotatable ring symmetrically disposed about the rotation axis by a synchronizing pin having a first end fixed to the rotatable ring, and a second end, rotatable in relation to the first end, slidably engagable with the outer end of the jaw. The first ends of the synchronizing pins are disposed on opposing sides of the rotatable ring. In one embodiment, the second end of the synchronizing pin has a rectangular shape and is slidably received in a channel in the outer end of the jaw. In one embodiment, the jaws include an inner end with two teeth having workpiece engagement surfaces, and may be opened and dosed to engage and retain the asymmetric workpiece by adjusting the jaw slides along a radial of the rotation axis. The rotation of one jaw about the pivot pin rotates, in synchronism, the rotatable ring and the other jaw to accurately align the geometric center of the asymmetric workpiece with the rotation axis of the chuck. The jaw slides are radially adjusted to open and close the jaws by reciprocating a piston along the rotation axis of the chuck. The piston is coupled to the jaw slides by two opposing cranks rotatable about a crank pivot which provides a levering action to adjust the jaw slides. A passive spring assembly applies a force to the piston which biases the jaws in the dosed position to geometrically center and clamp the workpiece. The spring assembly prevents the workpiece from becoming disengaged from the jaws in the event of a power failure. The jaws are opened in response to an applied counter-force applied to the piston by pneumatic or hydraulic actuation.

These and other objects, features and advantages of the present invention will become apparent upon consideration of the following Detailed Description of the Invention with the accompanying drawings.

DETAILED DESCRIPTION OF THE INVENTION

Figure 1A:
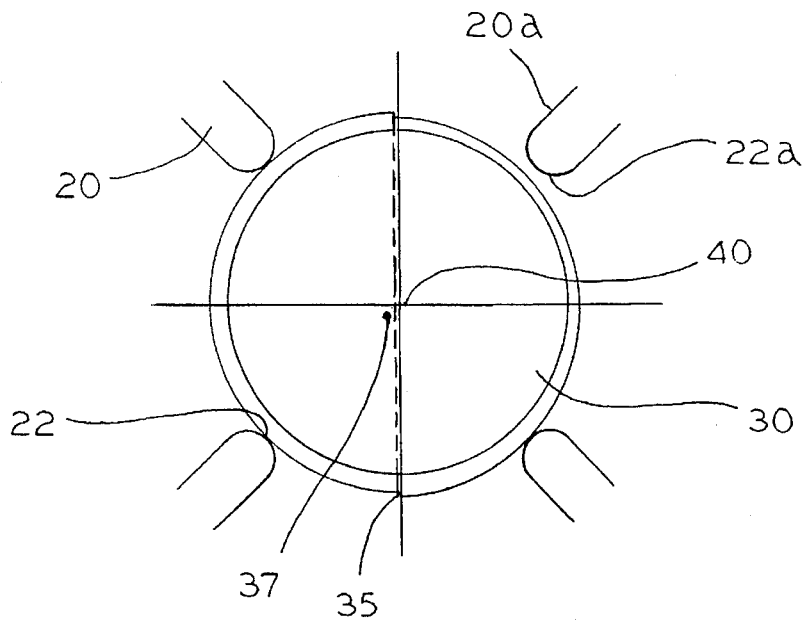
FIG. 1a is an end view of a prior art standard four jaw chuck illustrating the failure of all four jaws of the chuck to engage and securely retain an asymmetric workpiece, and the inaccurate alignment of the geometric center of the workpiece with a rotation axis of the chuck.
Figure 1B:
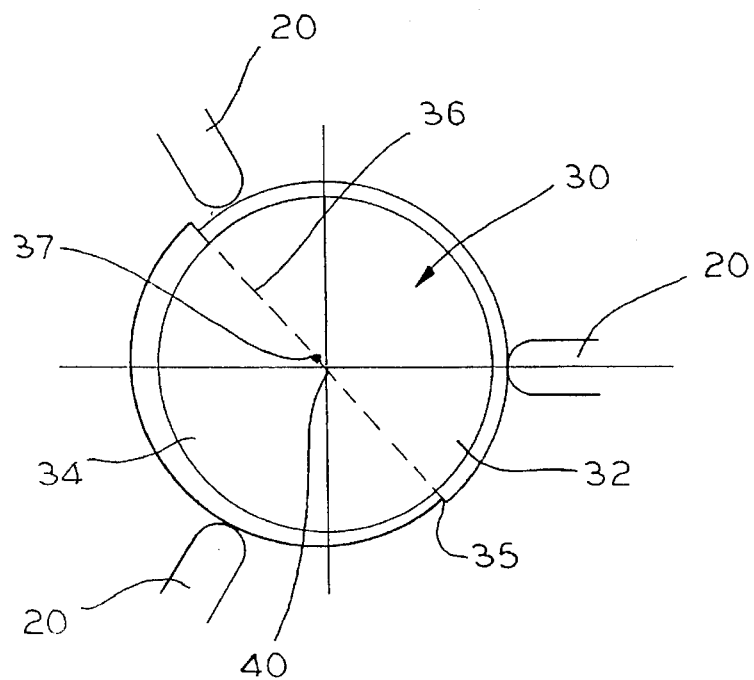
FIG. 1b is an end view of a prior art standard three jaw chuck illustrating the inaccurate alignment of the geometric center of an asymmetric workpiece with a rotation axis of the chuck.

FIG. 1a is an end view of a prior art chuck having, four jaws 20 symmetrically arranged about a rotation axis 40 of the chuck which corresponds with a rotation axis of a rotatable machine not shown in the drawing. The jaws 20 each include a workpiece engagement end, or tooth, 22, and are radially adjustable in synchronism about the rotation axis 40 so that the teeth 22 may engage and release the workpiece. The workpiece of FIG. 1 is an asymmetric shaft 30 having two sections 32 and 34 that are offset a small distance 35 in relation to one another along a parting line 36 that results in a quasi-elliptical shaped cross-section. In the four jaw chuck of FIG. 1a, the jaw 20a does not contact the shaft 30, and due to the asymmetry of the shaft 30, the geometric center 37 of the shaft is not aligned with the rotation axis 40 of the chuck. FIG. 1b is an end view of a prior art chuck having three jaws 20 symmetrically arranged about a rotation axis 40 of the chuck, wherein the center of the workpiece 37 is not aligned with the rotation axis.

Figure 3:
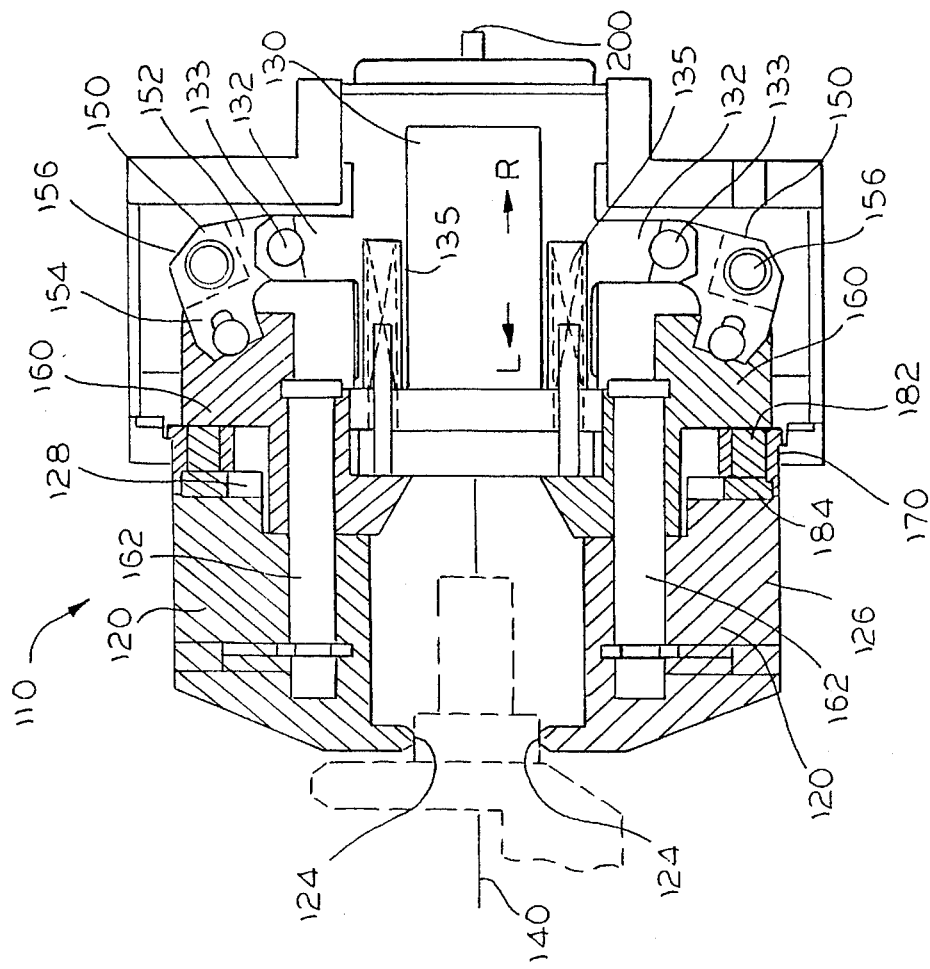
FIG. 3 is a partial sectional side view of the self compensating and geometrically centering two jaw chuck of FIG. 2 integrated in a chuck assembly in a rotating machine.
Figure 2:
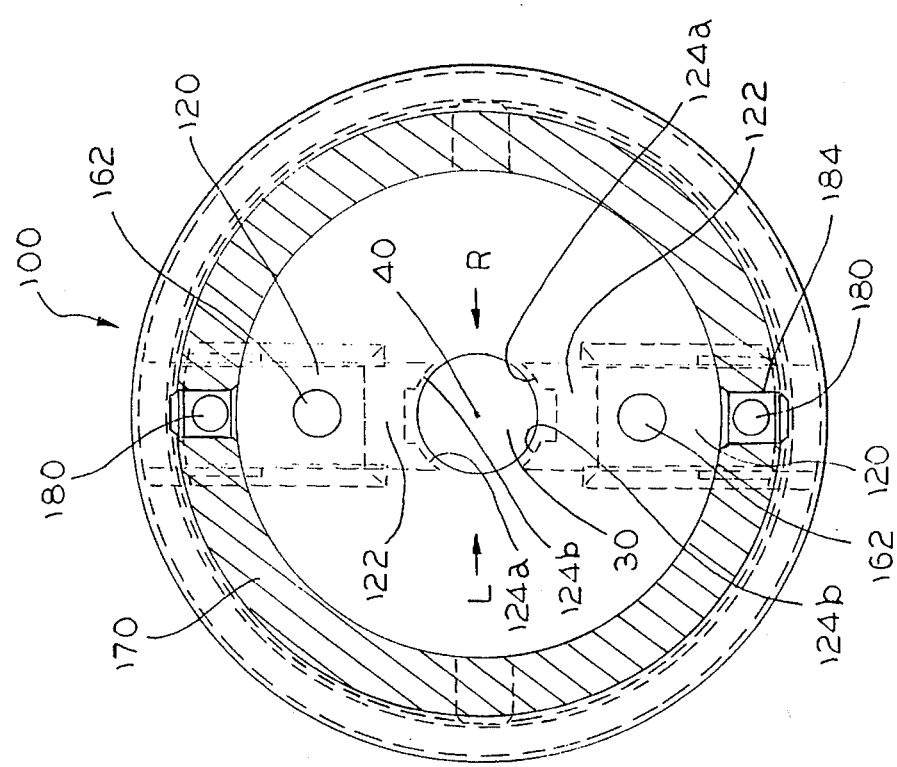
FIG. 2 is a partial sectional end view of a novel self compensating and geometrically centering two jaw chuck of the present invention for engaging and securely retaining an asymmetric shaft, wherein the geometric center of the asymmetric shaft is accurately aligned with a rotation axis the chuck.

FIG. 2 is a partial sectional end view of a novel self compensating and geometrically centering chuck 100 of the present invention, and FIG. 3 is a partial sectional side view of the chuck of FIG. 2 which is integrated in a chuck assembly 110 of a rotatable machine. In one embodiment, the chuck 100 comprises two jaws 120 symmetrically arranged about a rotation axis 140 of the machine, which axis corresponds with a rotation axis 40 of the chuck. The jaws 120 each have an inner end 122 that includes two teeth 124a and 124b for engaging and securely retaining the asymmetric shaft 30. These four teeth comprise the workpiece engaging surfaces, or gripping points, of the chuck 100, and locate the geometric center of the workpiece with the rotation axis of the chuck. The jaws 120 are radially adjustable in synchronism about the rotation axis 40 of the chuck so that the teeth 124 may engage and release the shaft 30. The jaws 120 are adjusted by reciprocating an actuatable piston 130 along the rotation axis of the machine. The piston 130 includes at least two ears 132 symmetrically disposed on the body of the piston, each ear having a pin 133 coupled to a first arm 152 of a crank 150 which is rotatable about a fixed pivot 156. A second arm 154 of each crank 150 is coupled to a jaw slide 160 which is radially adjustable about the rotation axis 140 of the machine in response to the reciprocating action of the piston 130. The jaws 120 are coupled to the jaw slides 160 as further discussed below, and are opened, or separated, when the piston 130 is moved to the left in the direction of arrow L, and closed when the piston is moved to the right in the direction of arrow R. In one embodiment, the jaw slides 160, and accordingly the jaws 120, are biased in the closed position in the direction of arrow R by a passive spring assembly 135 acting on the piston 130. The force of the spring is overcome, and the piston 130 moved in the direction of the arrow L to open the jaws 120, by pneumatic or hydraulic actuation through port 200. This piston actuating arrangement ensures that the jaws 120 will be maintained in a closed and secured position by the passive spring assembly in the event of a power failure.

The jaws 120 of the geometric centering chuck 100 are each coupled to a corresponding jaw slide 160 by a pivot pin 162 which extends into a median portion of the jaw and permits the jaw to rotate about the pivot pin. Each jaw 120 includes an outer end 126 which is coupled to a rotating ring 170 by a synchronizing pin 180. A first end 182 of the synchronizing pin 180 is rotatably connected to, or pivotally disposed on, the ring 170. A second end 184 of the synchronizing pin 180 is slidably received in a channel 128 of the jaw 120. In one embodiment, the second end 184 of the pin 180 has a rectangular shape to increase the contact area between the end 184 and the channel 128 of the jaw 120. Other geometries may also be used so long as a sliding relationship exists between the second end 184 of the synchronizing pin and the jaw 120 to permit radial adjustment of the jaws 120 in relation to the synchronizing ring 170, wherein the jaws 120 may engage or release the shaft 30 in response to the reciprocating action of the piston 130. In another embodiment, the self centering chuck 100 comprises three, four or more jaws 120 rotatably coupled to a corresponding jaw slide by a pivot and coupled to the rotating ring 170 as discussed above, wherein the jaws 120 are symmetrically arranged about the rotation axis 40 of the chuck. Some applications require that an asymmetric workpiece 30 be supported at both ends, and to accommodate this requirement, the novel geometric centering chuck of the present invention may be disposed at opposing ends of the asymmetric workpiece.

In operation, to open the jaws 120 for receiving an asymmetric workpiece 30, the jaws are moved, in synchronism, radially outward from the rotation axis 40 to provide an adequate separation for positioning the workpiece for engagement between the jaws. In the two jaw chuck of FIG. 2, the workpiece 30 may be positioned between the jaws 120 by advancing the workpiece along the right arrow R or the left arrow L. This feature of the two jaw chuck is advantageous over an embodiment comprising three or more jaws which can not be separated a sufficient distance to allow positioning the workpiece between the jaws as in FIG. 2. In case of three or more jaws, the workpiece must be positioned between the jaws 120 by advancing the workpiece along the rotation axis 140, which may first require disassembly of the machinery. To dose the jaws 120 and engage the workpiece 30, the jaws are moved, in synchronism, radially inward toward the rotation axis 40 until the jaws engage the workpiece. However, because the workpiece 30 is not symmetric, the two teeth 124a and 124b on each jaw do not engage the workpiece simultaneously. In the exemplary embodiment of FIG. 2, tooth 124a of one or both of the jaws engage the workpiece 30 before the other tooth 124b. As each jaw 120 continues to move in toward the rotation axis 140 to fully engage the workpiece 30, the jaws rotate in a clockwise direction about the pivot pin 162. In the alternative, if the tooth 124b had first engaged the workpiece, the jaw 120 would rotate in a counterclockwise direction about the pivot pin 162. Generally, a rotating jaw 120 also rotates the rotating ring 170 in the same direction due to the coupling between the jaw and the rotating ring as discussed above. Further, the interconnection between the jaws 120 and the rotating ring 170 causes all of the jaws to rotate, in synchronism, in the same direction about their respective pivots 162. The synchronized rotation of the jaws 120 ensures that the rotation axis of the chuck 40 corresponds with the rotation axis of the machinery 140. The jaws 120 and rotating ring 170 stop rotating when the workpiece 30 is fully engaged and securely retained by the teeth 124a and 124b of the jaws 120, wherein the geometric center of the asymmetric workpiece 30 is accurately aligned with the rotation axis 40 of the chuck and the rotation axis 140 of the machinery. As discussed above, other embodiments may include three or four or more jaws, and in these embodiments the jaws 120 rotate about the respective pivots 162 as discussed above. Accordingly, the present invention will accurately align the geometric center of an asymmetric workpiece having an irregular cross sectional shape with the rotation axis of the chuck.

The foregoing is a description enabling one of ordinary skill in the art to make and use the preferred embodiments of the present invention. It will be appreciated by those skilled in the art that there exist variations, modifications and equivalents to the embodiments disclosed herein. The present invention therefore is to be limited only by the scope of the appended claims.

What is claimed is:

1. A chuck for engaging and retaining a workpiece, the chuck comprising:

at least two opposing jaw slides disposed about a fixed rotation axis, each jaw slide having a pivot pin extending therefrom, parallel to and symmetrically arranged about the rotation axis, wherein each jaw slide is adjustable to move the pivot pins, in synchronism, along a radial of the rotation axis;

a jaw rotatably disposed about each pivot pin of the jaw slide, each jaw having an outer end with a sliding engagement surface, and each jaw having an inner end with two workpiece engaging surfaces, wherein each jaw is adjustable along a radial of the rotation axis in agreement with movement of the pivot pins, wherein the jaws may be opened and closed so that the workpiece engaging surfaces may engage and retain a workpiece;

a rotatable ring symmetrically disposed about the rotation axis; and two synchronizing pins each having one end pivotally disposed, in a diametric relation, on the rotating ring, each synchronizing pin having a second end coupled to the first end, the second end of each synchronizing pin slidably engagable with the sliding engagement surface of a corresponding jaw, wherein the second end of each pin is slidable in relation to the jaw when the jaw is adjusted along a radial of the rotation axis, and wherein the rotation of one jaw about a pivot pin rotates, in synchronism, the rotatable ring and the other jaw to accurately align a geometric center of the workpiece with the fixed rotation axis.

2. The chuck of claim 1, further comprising a piston reciprocatable along the rotation axis, the piston having opposing ears, and two rotatable cranks disposed on opposing sides of the piston and pivotable about a fixed pivot pin, each crank having a first arm engagable with an ear of the piston, and each crank having a second arm engagable with a jaw slide, wherein the reciprocating action of the piston rotates each crank about its pivot which adjusts each jaw slide along a radial of the rotation axis to open and close the jaws of the chuck.

3. The chuck of claim 2, further comprising a passive spring assembly coupled to the piston and applying a force to the piston which biases the jaws in a closed position, and a power actuator for moving the piston along the rotation axis against the force of the passive spring assembly to open the jaws of the chuck.

4. The chuck of claim 2, wherein the crank is an angle shaped member having a median portion rotatable about the fixed crank pivot pin.

5. The chuck of claim 1, wherein the sliding engagement surface of the jaw slide is a channel for slidably receiving the second end of the synchronizing pin, the second end of the synchronizing pin having a rectangular shape for increasing the contact surface area between the second end of the synchronizing pin and the channel of the jaw.

6. The chuck of claim 1, wherein the workpiece engaging surfaces are disposed on two teeth extending frown the inner end of the jaw, and wherein one tooth may engage the asymmetric workpiece before the other tooth, which engagement rotates the jaw about the pivot pin and rotates, in synchronism, the rotatable ring and the other jaw.

7. A method for accurately aligning a geometric center of a workpiece along a fixed rotation axis using opposing adjustable jaws each rotatable about a pivot pin parallel to the fixed rotation axis, an outer end of each jaw being rotatably and slidably coupled to a rotatable ring symmetrically disposed about the fixed rotation axis, the method comprising the steps of:

positioning the workpiece between the jaws;

adjusting the jaws along a radial toward the fixed rotation axis;

partially engaging the workpiece with one jaw; and rotating the one jaw about the pivot pin and rotating, in synchronism, the rotatable ring and the opposing jaw until both jaws engage the workpiece so that the geometric center of the workpiece is accurately aligned with the fixed rotation axis.

8. The method of claim 7, further comprising a step of retaining the jaws in engagement with the workpiece with a passive spring assembly, wherein the workpiece is securely rotatable about an axis through its geometric center.

* * * * *